(12) United States Patent
Winter et al.

(10) Patent No.: US 7,869,431 B2
(45) Date of Patent: Jan. 11, 2011

(54) SYSTEM AND METHOD FOR COMMUNICATION OF UNCOMPRESSED VISUAL INFORMATION THROUGH A NETWORK

(75) Inventors: Robert Winter, Leander, TX (US); Bruce Montag, Austin, TX (US); Liam B. Quinn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 345 days.

(21) Appl. No.: 11/746,930

(22) Filed: May 10, 2007

(65) Prior Publication Data
US 2008/0279186 A1    Nov. 13, 2008

(51) Int. Cl.
H04L 12/28 (2006.01)
H04L 12/56 (2006.01)
H04N 7/18 (2006.01)
H04N 7/16 (2006.01)

(52) U.S. Cl. .......................... 370/389; 370/352; 725/78; 725/148

(58) Field of Classification Search ................ 370/389, 370/395.1, 352; 375/240.12, 78, 148
See application file for complete search history.

(56) References Cited

U.S. PATENT DOCUMENTS

| 5,455,599 | A | 10/1995 | Cabral et al. ................. 345/133 |
| 7,096,272 | B1* | 8/2006 | Raman ....................... 709/231 |
| 2003/0161332 | A1* | 8/2003 | Ohno et al. .................. 370/401 |
| 2005/0195823 | A1* | 9/2005 | Chen et al. ............... 370/395.1 |
| 2006/0262791 | A1* | 11/2006 | Kadambi et al. ............ 370/389 |
| 2008/0205519 | A1* | 8/2008 | Goodart et al. ........ 375/240.12 |

* cited by examiner

*Primary Examiner*—Pankaj Kumar
*Assistant Examiner*—Lonnie Sweet
(74) *Attorney, Agent, or Firm*—Hamilton & Terrile, LLP; Robert W. Holland

(57) ABSTRACT

DisplayPort micropackets of uncompressed visual information are adapted to conventional network infrastructure with a switch having DisplayPort ports, network ports and a packet converter. The packet converter encapsulates DisplayPort packets for communication through network ports and extracts DisplayPort packets from network packets for communication through DisplayPort ports. An address resolution table associates the switch ports with each other and with a packet converter operation by using a control field that defines the packet converter operation for information received at each port, such as encapsulation, extraction or native switching.

20 Claims, 3 Drawing Sheets

SYSTEM AND METHOD FOR COMMUNICATION OF UNCOMPRESSED VISUAL INFORMATION THROUGH A NETWORK

BACKGROUND OF THE INVENTION

1. Field of the Invention

The present invention relates in general to the field of information handling system displays and networks, and more particularly to a system and method for communication of uncompressed visual information through a network.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically interact with end users through a visual display. The increasingly powerful components used in information handling systems have allowed presentation of visual images with high resolutions that use large numbers of pixels disposed in a display. High resolution images typically require large amounts of information with pixel values frequently refreshed at a display. Generally, in order to generate high resolution images, information handling systems compress the visual information until the visual information is rendered as pixel values for communication to a display. For example, pictures or videos are stored in compressed form, such as JPEG and MPEG formats, and, often, much of the processing for creating the visual images is performed by specialized components located in a graphics card. By keeping visual information compressed until it is rendered by the graphics card into pixel values, less bandwidth is used within the information handling system for communicating the visual information between processing components, such as from memory to the CPU or the graphics card. The rendered visual information typically proceeds from the graphics card to the display using display-specific connections, such as VGA or DVI connections. These display-specific connections are designed to keep a steady flow of uncompressed pixel-level visual information from the graphics card to the display controller, which directs the display pixels to present colors determined from the uncompressed visual information.

Recently, to increase the flexibility available when communicating uncompressed visual information to a display, industry has introduced the DisplayPort specification to define a digital I/O interface for internal and external display platforms. The DisplayPort specification provides an asynchronous bi-directional mechanism to deliver uncompressed digital packetized video streams over a two pair wire interface with pixel data encapsulated into 64 byte micropacket transport units. The transport units contain data, control and synchronization for an end device, known as a sink, which receives video from a single transmitting source device. DisplayPort sink devices store EDID information that is communicated from the sink device to the source device. Although the DisplayPort digital packetized architecture implies an ability to steer packets to different locations, version 1.1 of the DisplayPort specification only provides for a direct link between a single source and sink pair of devices, such as through a direct cable connection.

SUMMARY OF THE INVENTION

Therefore a need has arisen for a system and method which encapsulates uncompressed visual information packets for communication across a network architecture.

In accordance with the present invention, a system and method are provided which substantially reduce the disadvantages and problems associated with previous methods and systems for communication of uncompressed visual information packets across a network. A packet converter switch receives uncompressed visual information packets at a first set of display device ports and selectively directs the visual information to network ports based on an address resolution table stored on the switch. A packet converter encapsulates the uncompressed visual information packets into network packets for communication over a network.

More specifically, a packet converter switch has plural display device ports, such as DisplayPort ports, and plural network ports, such as Ethernet ports. Uncompressed visual information received at a display device port is selectively switched by a switch matrix to a network port based upon a lookup in an address resolution table that associates display device and network ports. A packet converter encapsulates the uncompressed visual information packets into network packets using an operation defined for the port in the address resolution table. The encapsulated packets are forwarded to the network port for communication through the network. For example, the network packets are sent through the Internet to another packet converter switch and accepted through a network port. The uncompressed visual information is extracted from the network packets and switched to a display device port based upon a lookup at an address resolution table stored on the switch. The association of ports is established with a packet converter policy engine that allows updates to the address resolution table, including definition of the operation to be performed upon information received at each port.

The present invention provides a number of important technical advantages. One example of an important technical advantage is that uncompressed visual information packets, such as DisplayPort packets, are encapsulated for communication through legacy networks that allow switching of the visual information to varied destinations. Visual information micropackets are switched, converted to legacy packets and regenerated as micropackets to support communication of uncompressed visual information to plural possible destinations. Placing uncompressed visual information into a network architecture provides for convenient presentation of visual information at a display distal to the rendering of the visual information without requiring a direct cable connection.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Uncompressed visual information packets are adapted for communication between information handling systems and display devices over conventional networks by a packet converter switch. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
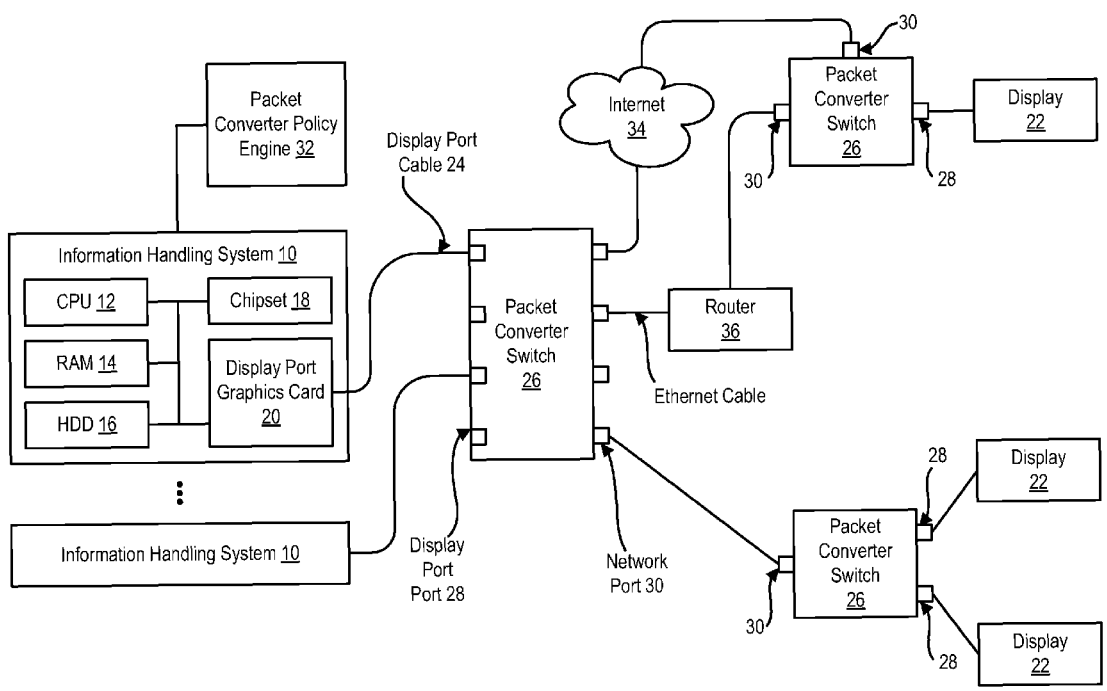
FIG. 1 depicts a block diagram of a system of networked devices for communicating uncompressed visual information packets.

Referring now to FIG. 1, a block diagram depicts a system of networked devices for communicating uncompressed visual information packets. Information handling systems 10 are built from plural processing components, such as a CPU 12, RAM 14, a hard disk drive 16, a chipset 18 and a DisplayPort graphics card 20, which cooperate to generate uncompressed visual information for presentation to an end user at a display device 22. DisplayPort graphics card 20 outputs visual information in micropackets and provides bi-directional control information as defined by the DisplayPort standard. The DisplayPort micropackets are directed to a display device though a direct connection with a DisplayPort cable 24, and thus lack network address information as output from information handling system 10. A packet converter switch 26 provides selective packet converter operations in order to communicate the uncompressed visual information packets output by DisplayPort graphics card 20 to one or more distal locations via a network. For example, packet converter switch 26 receives uncompressed visual information packets from an information handling system 10 in one of a first set of DisplayPort ports 28, encapsulates the uncompressed visual information into network packets and then communicates the network packets through one of plural network ports 30. A map of associated DisplayPort and network ports is maintained in packet converter switch 26 by a packet converter policy engine 32 and, for example, aided by automated or manual discovery of devices interfaced with packet converter switch 26.

The network packets traverse conventional network architecture, such as the Internet 34 or routers 36, to reach a network port of a second packet converter. Network packets received at a network port of packet converter switch 26 have the uncompressed visual information extracted for communication through a DisplayPort port 28 to a display device 22 for presentation. The association of the network port and DisplayPort port is determined by a map on the second packet converter switch 28 stored by interaction with a packet converter policy engine 32. The map on each packet converter switch 26 includes other relevant information to aid in the encapsulation and extraction operations, such as network address and DisplayPort sink address information as well as the operation to be performed on packets arriving at each port. In addition to encapsulation and extraction operations, native switching of visual information supported between related ports, such as at layer 2 or layer 3 levels on Ethernet network ports 30. Further, bi-directional DisplayPort functions are supported, such as communication of EDID information from a display 22 to an information handling system 10 by reference to mapping information on a packet converter switch to correctly switch information sent from a sink to a source device.

Figure 2:
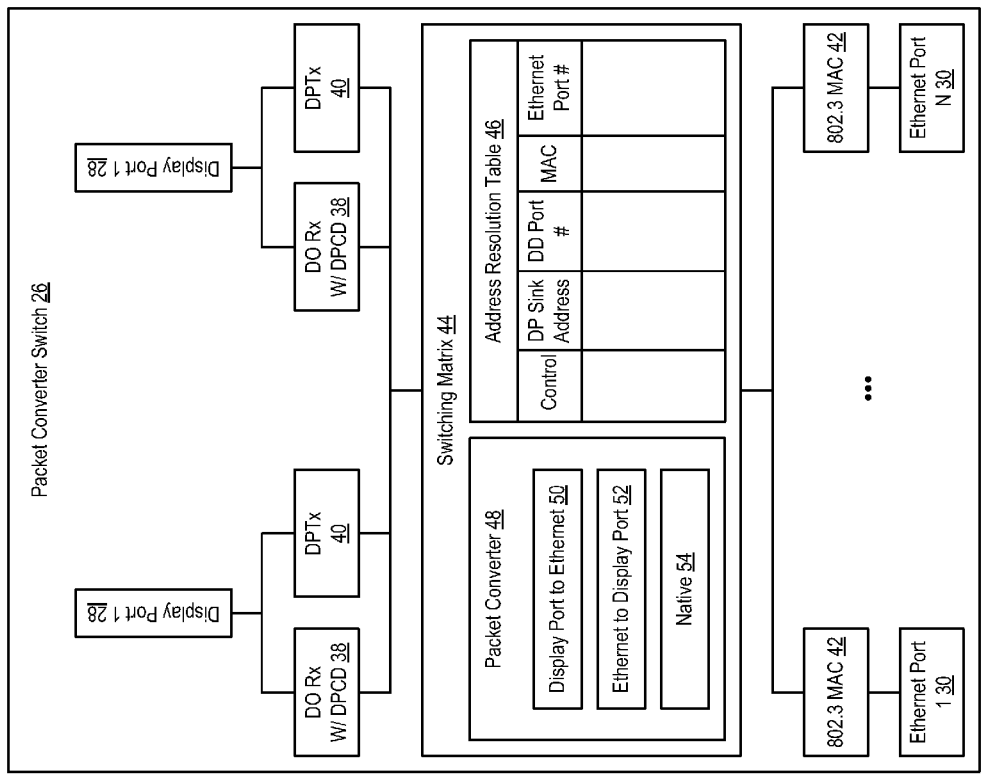
FIG. 2 depicts a block diagram of a switch for adapting DisplayPort uncompressed visual information to an Ethernet network.

Referring now to FIG. 2, a block diagram depicts a switch 26 for adapting DisplayPort uncompressed visual information to an Ethernet network. DisplayPort ports 28 couple to DisplayPort cables to communicate uncompressed visual information packets. A receive module 38 receives inbound packets and a transmit module 40 transmits outbound packets. Ethernet ports 30 couple to Ethernet cables to communicate network packets with a network, such as layer 2 or 3 levels supported by an 803.3 MAC module 42. Information is switched between ports 28 and 30 by a switching matrix 44. Switching matrix 44 directs packets between ports by reference to an address resolution table 46. For example, detection of information at DisplayPort number 1 leads switching matrix 44 to lookup DP port #1 to find an associated Ethernet port number. The information received at DP port #1 is thus switched to the associated Ethernet port number. In addition, a packet converter 48 references a control field of address resolution table 46 to determine a packet conversion operation associated with information received at DP port #1. The packet conversion operations include a DisplayPort to Ethernet function 50 that encapsulates DisplayPort packets into Ethernet packets, an Ethernet to DisplayPort function 52 that extracts DisplayPort packets from network packets and a native function 54 that supports switching between similar ports that do not need conversion.

As an example, uncompressed DisplayPort packets of visual information that arrive at a port 28 result in a lookup of the port in address resolution table 46 by switching matrix 44. The lookup identifies the port 28 or 30 that receives the visual information and the operation to be performed on the visual information. For uncompressed visual information packets received at a DisplayPort port that are communicated to a network port, the DisplayPort to Ethernet function 50 is used to encapsulate the visual information into network packets, such as with address information available in address resolution table 46. As an alternative example, network packets arriving at an Ethernet port 30 result in a lookup of the Ethernet port that receives the network packet in address resolution table 46 for the port that will receive the information and the function to be performed on the network packet. If a DisplayPort port 28 is to receive visual information encapsulated in the network packet, then the Ethernet to DisplayPort function 52 extracts the uncompressed visual information packets from the network packets and forwards the visual information to the associated port 28. In some instances, DisplayPort control information will be communicated instead of visual information, such as EDID information from a display device to an information handling system. In other instances, where DisplayPort information proceeds to another DisplayPort port 28, or where Ethernet information proceeds to another Ethernet port 30, native function 54 supports switching between desired ports without conversion functions.

Figure 3:
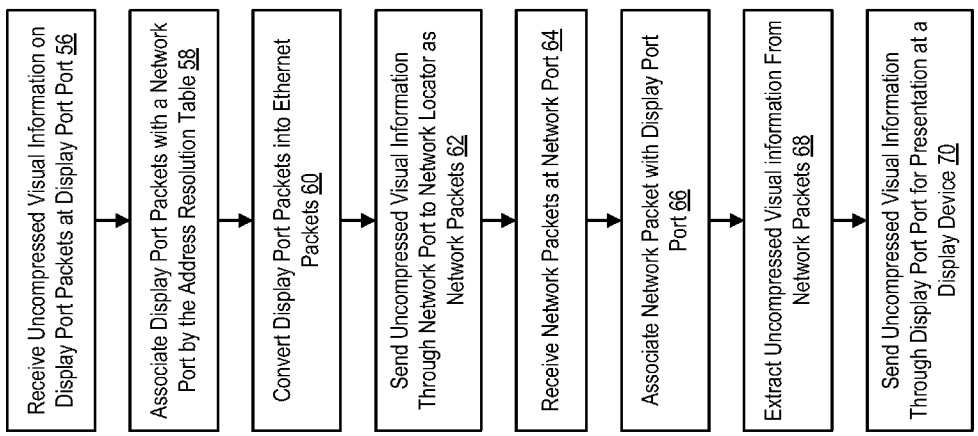
FIG. 3 depicts a flow diagram of a process for adapting DisplayPort uncompressed visual information to an Ethernet network.

Referring now to FIG. 3, a flow diagram depicts a process for adapting DisplayPort uncompressed visual information to an Ethernet network. The process begins at step 56 with receipt of uncompressed visual information in DisplayPort packets at a DisplayPort port. At step 58, the DisplayPort packets are associated with a network port by reference to a lookup in the address resolution table of the port that received the packets to determine the network that is to receive the packets. At step 60, the DisplayPort packets are converted into Ethernet packets using address information of the Ethernet port found in the address resolution table lookup. At step 62, the uncompressed visual information is sent encapsulated in network packets to the Ethernet port for communication to the network. At step 64, the network packets are sent through the network and received at a network port of another packet converter switch. At step 66, the network port that received the network packets is associated with a DisplayPort port by reference to the address resolution table of the switch. At step 68, the uncompressed visual information packets are extracted from the network packets and forwarded to the associated DisplayPort port. At step 70, the uncompressed visual information is sent through the DisplayPort port for presentation at a display device.

Although the present invention has been described in detail, it should be understood that various changes, substitutions and alterations can be made hereto without departing from the spirit and scope of the invention as defined by the appended claims.

What is claimed is:

1. A system for communicating uncompressed visual information through a network, the system comprising:
 plural display device ports operable to connect with a display device cable to communicate uncompressed visual information packets through the display device cable with a display device;
 plural network ports operable to connect with a network cable to communicate network packets through the network cable with a network;
 an address resolution table mapping one or more predetermined display device ports to one or more associated network ports; and
 a packet converter integrated in a common housing with the display device ports, the network ports and the address resolution table, the packet converter operable to encapsulate uncompressed visual information packets received from a predetermined display device port into network packets communicated to an associated network port.

2. The system of claim 1 wherein:
 the address resolution table maps one or more predetermined network ports to one or more associated display device ports; and
 the packet converter is further operable to extract uncompressed visual information from network packets received from a predetermined network port and to communicate the uncompressed visual information to an associated display device port.

3. The system of claim 2 wherein the address resolution table comprises mapped pairs of display device and network ports, each mapped pair having a control field, the control field indicating a packet converter operation for visual information associated with the mapped pair.

4. The system of claim 3 further comprising a policy engine interfaced with the address resolution table and operable to map the ports.

5. The system of claim 1 wherein the network port comprises an Ethernet port.

6. The system of claim 1 wherein the display device port comprises a DisplayPort port.

7. The system of claim 1 wherein the packet converter is further operable to receive control information from the network port and to communicate the control information to the display device port.

8. The system of claim 1 further comprising a switch interfaced with at least first and second display device ports and the address resolution table, the switch operable to communicate information between the first and second display device ports according to mapping between the first and second display device ports of the address resolution table.

9. The system of claim 1 further comprising a switch interfaced with at least first and second network ports and the address resolution table, the switch operable to communicate information between the first and second network ports according to mapping between the first and second network ports of the address resolution table.

10. A method for communicating uncompressed visual information, the method comprising:
 receiving uncompressed visual information packets at a display device port of a switch;
 associating the uncompressed visual information packets with a network port, the network port having associated network information;
 applying the network information to encapsulate the uncompressed visual information packets into network packets in the switch; and
 communicating the uncompressed visual information from the network port of the switch to a network in the network packets.

11. The method of claim 10 further comprising:
 receiving control information at a network port of the switch;
 associating the control information with a display device port of the switch; and
 communicating the control information to the associated display device port.

12. The method of claim 10 further comprising:
 receiving network packets at a network port of the switch, the network packets having encapsulated uncompressed visual information packets;
 associating the uncompressed visual information packets with a display device port of the switch;
 extracting the uncompressed visual information packets from the network packets; and
 communicating the uncompressed visual information from the associated display device port of the switch.

13. The method of claim 12 wherein the display device port comprises a DisplayPort port.

14. The method of claim 12 wherein the network port comprises an Ethernet port.

15. The method of claim 12 wherein associating the uncompressed visual information packets with a network port further comprises looking up the display device port in a table located on the switch to retrieve a network port associated with the display device port.

16. The method of claim 15 further comprising interacting with the table through a network port of the switch to associate network ports of the switch with display device ports of the switch.

17. A method for communicating uncompressed visual information, the method comprising:
   sending the uncompressed visual information from an information handling system through a cable to a display device port of a first switch;
   associating the uncompressed visual information at the first switch with a network port of the first switch;
   encapsulating the uncompressed visual information at the first switch into network packets for communication to a network through the network port;
   sending the network packets through a network to a network port of a second switch;
   associating the network packets at the second switch with a display device port of the second switch; and
   extracting the uncompressed visual information at the second switch from the network packets for communication to a display device through the display device port of the second switch.

18. The method of claim 17 wherein the display device ports comprise DisplayPort ports.

19. The method of claim 17 wherein the network ports comprise Ethernet ports.

20. The method of claim 17 wherein the network comprises the Internet.

* * * * *